(12) United States Patent
Escande et al.

(10) Patent No.: US 8,973,468 B2
(45) Date of Patent: Mar. 10, 2015

(54) TOOL FOR THE MOUNTING/REMOVAL OF A MOTOR VEHICLE BATTERY

(75) Inventors: Bruno Escande, Septeuil (FR); Francois Combe, Meulan (FR)

(73) Assignee: RENAULT s.a.s., Boulogne Billancourt (FR)

( * ) Notice: Subject to any disclaimer, the term of this patent is extended or adjusted under 35 U.S.C. 154(b) by 252 days.

(21) Appl. No.: 13/514,078

(22) PCT Filed: Dec. 13, 2010

(86) PCT No.: PCT/FR2010/052677
§ 371 (c)(1), (2), (4) Date: Jun. 6, 2012

(87) PCT Pub. No.: WO2011/083228
PCT Pub. Date: Jul. 14, 2011

(65) Prior Publication Data
US 2012/0240730 A1 Sep. 27, 2012

(30) Foreign Application Priority Data

Dec. 21, 2009 (FR) ...................................... 09 59269

(51) Int. Cl.
*B25B 27/14* (2006.01)
*H01M 2/10* (2006.01)
*B60L 11/18* (2006.01)

(52) U.S. Cl.
CPC ......... *H01M 2/1083* (2013.01); *B60L 11/1822* (2013.01); *B60L 11/1877* (2013.01); *B60L 11/1879* (2013.01); *Y02T 10/7005* (2013.01); *Y02T 10/705* (2013.01); *Y02T 10/7072* (2013.01); *Y02T 90/124* (2013.01); *Y02T 90/14* (2013.01)
USPC ............................................................ 81/54

(58) Field of Classification Search
USPC ............ 81/52, 54, 484, 486, 180.1, 462, 488; 411/552, 555, 349
See application file for complete search history.

(56) References Cited

U.S. PATENT DOCUMENTS

| 2,610,379 | A | * | 9/1952 | Bugg | ........................... | 411/349 |
| 6,170,304 | B1 | | 1/2001 | Ohta | | |
| 6,267,543 | B1 | * | 7/2001 | David et al. | .................. | 411/552 |
| 8,076,020 | B2 | * | 12/2011 | Goto et al. | ..................... | 429/129 |
| 2007/0108877 | A1 | | 5/2007 | Bergmann et al. | | |
| 2009/0074539 | A1 | | 3/2009 | Mahdavi | | |
| 2010/0145717 | A1 | * | 6/2010 | Hoeltzel | ........................ | 705/1.1 |

(Continued)

FOREIGN PATENT DOCUMENTS

WO         2008 128991         10/2008

OTHER PUBLICATIONS

U.S. Appl. No. 13/517,997, filed Jun. 21, 2012, Escande.
French Search Report Issued Apr. 12, 2010 in FR 09 59269 Filed Dec. 21, 2009.

(Continued)

*Primary Examiner* — Hadi Shakeri
(74) *Attorney, Agent, or Firm* — Oblon, McClelland, Maier & Neustadt, L.L.P.

(57) ABSTRACT

A tool for mounting or removing a container of energy that powers an engine or motor that propels a motor vehicle, fixed to the motor vehicle using a lock on which there acts a piston that loads the lock. The tool includes at least one tool attachment device, a device for releasing the load on the lock by acting on the piston, and a device for locking and/or unlocking the battery.

11 Claims, 5 Drawing Sheets

(56) References Cited

U.S. PATENT DOCUMENTS

2012/0110831 A1    5/2012  Escande et al.
2012/0255800 A1*  10/2012  Lejeune et al. ............. 180/68.5

OTHER PUBLICATIONS

International Search Report Issued Apr. 21, 2011 in PCT/FR10/52677 Filed Dec. 13, 2010.

* cited by examiner

TOOL FOR THE MOUNTING/REMOVAL OF A MOTOR VEHICLE BATTERY

BACKGROUND

The present invention relates to a tool for mounting and/or removing a container of energy that powers an engine or motor that propels a motor vehicle, for example so that it can be recharged and/or replaced.

Certain motor vehicles, such as electric or hybrid vehicles, comprise a container of energy that powers a propulsion engine or motor, such as an electric battery that powers an electric motor. It may prove advantageous to exchange this container, when its level of energy is low, for a new container which is full of energy. This can be done in a station similar to a service station in which a motor vehicle can have its tank filled with fuel.

Document U.S. Pat. No. 5,612,606 discloses a station for exchanging the electric battery that powers a motor that propels an electric vehicle and a method for performing such an exchange. In the exchange station described, the driver positions the vehicle approximately in a rail, against a longitudinal end stop with respect to the equipment belonging to the station. After that, in phases that are fairly automatic, mobile means for removing the electric battery and for assembling the new battery in the vehicle position themselves relative to the vehicle using sensors. The number of sensors and electronic means required for the operation of such a station makes it not very reliable and means that it cannot operate very robustly.

To make it easy to roll out energy container exchange stations (requiring little by way of technological competence), it is necessary to offer an energy container exchange system that is reliable and robust, and therefore a method and associated tooling for removing energy containers that work well.

BRIEF SUMMARY OF THE INVENTION

Thus, it is an object of the invention to provide a solution for mounting or removing an energy container that addresses the disadvantages mentioned hereinabove and improves the replacement methods known from the prior art.

In particular, the invention proposes a tool for mounting or removing an energy container that is simple and reliable.

To this end, the invention relies upon a tool for mounting or removing a container of energy that powers an engine or motor that propels a motor vehicle, fixed to the motor vehicle using a lock on which there acts a piston that loads the lock, characterized in that it comprises:
  at least one tool attachment means;
  a means for releasing the load on the lock by acting on the piston;
  a means for locking and/or unlocking the battery.

The means for locking and/or unlocking the battery may be arranged in the upper part of a rod capable of turning.

The locking and/or unlocking means may have a male or female connection, of the hexagonal or rectangular or square or flat or flatted type.

The means for releasing the load on the lock may have translational mobility about the rod of the means for locking and/or unlocking the battery.

The means for releasing the load on the lock may have mobility via a screw/jack principle, a hydraulic actuator, a cam system, a pneumatic system or a lever.

The means for releasing the load on the lock and the means for locking and/or unlocking the battery may be formed in the upper part of a central cylindrical body of the tool.

The tool for mounting or removing a power supply energy container may comprise two tool attachment means distributed symmetrically about the means for releasing the load on the lock.

The at least one tool attachment means may be a male or female connection for a connection of the type based on at least one mushroom head.

The tool for mounting or removing a power supply energy container may be portable and suited to manual use or may be motorized.

This mounting or removal tool as described hereinabove therefore allows the replacing of a motor vehicle battery to be carried out and is also intended for any repair work carried out on a motor vehicle following the sale thereof.

BRIEF DESCRIPTION OF THE DRAWINGS

These objects, features and advantages of the present invention will be explained in detail in the following description of one particular embodiment given by way of non-limiting example with reference to the attached figures in which.

DETAILED DESCRIPTION OF THE INVENTION

The invention applies to any vehicle comprising a power supply energy container positioned in the rear luggage compartment or under the chassis. The remainder of the description describes the removal of an energy container by describing the removal of a battery that supplies electrical power to a motor that propels a vehicle. However, the invention applies to any type of power supply container and also applies to the mounting of such a power supply container, by performing the operations in reverse.

Figure 1:
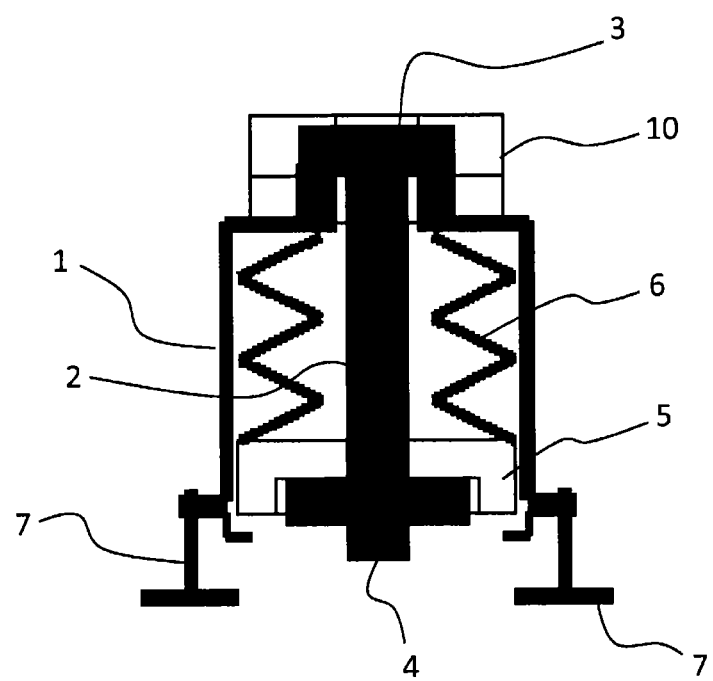
FIG. 1 is a view in cross section of a battery provided with a locking device suitable for implementation of the method for mounting or removing a battery according to the embodiment of the invention.

The invention is connected with the principle via which such a battery is attached, which is illustrated in FIG. 1 by way of example. A battery 1 is locked by a lock 2 which comprises a first end 3, collaborating with the bodyshell 10 of a motor vehicle which forms a latch fitting to perform the function of locking the battery, and a second end 4, comprising a collecting means intended for actuating the lock 2. The lock 2 is mounted so that it can turn on the battery, so that it can perform its locking or unlocking function. The battery further comprises a piston 5 acting on the lock 2 via an elastic element 6, such as a spring, in order to keep the lock 2 securely in the locked position.

More generally, the method of removing the battery, which will be described hereinafter, is suited to any principle of attaching a battery of the above type that combines a turning lock associated with a device for placing the lock under load.

Figure 2:
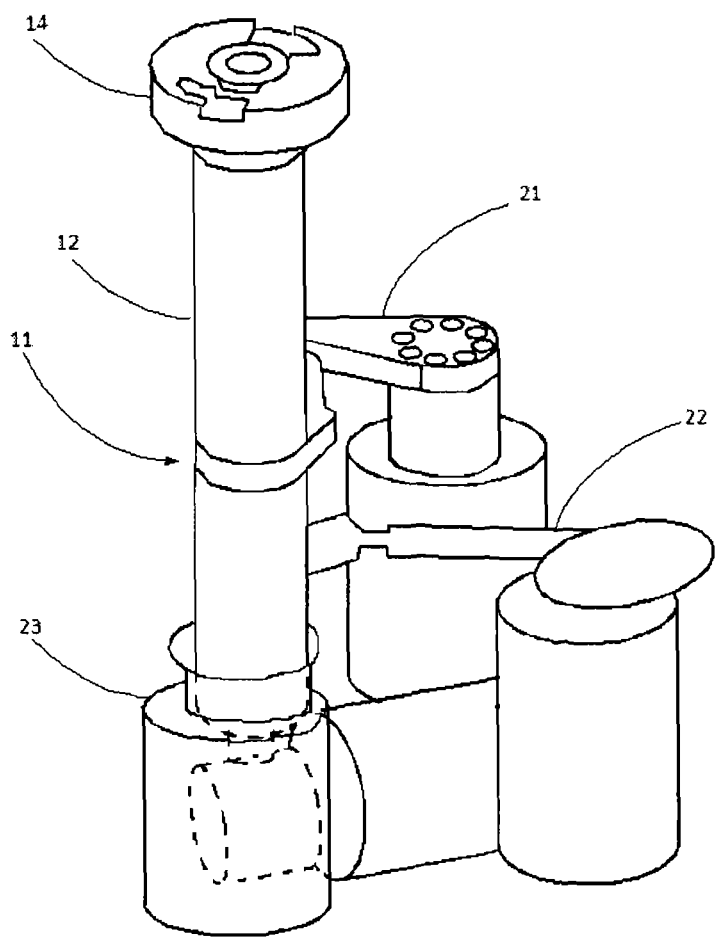
FIG. 2 is a perspective view from above of a tool that can be used to implement the method for mounting or removing a battery according to a first embodiment of the invention.

The method of removing the battery 1 is implemented using a tool 11, for example as depicted in FIG. 2, which will be described later on. It comprises the following two essential steps, performed automatically by the tool 11:

E1: action on the piston 5 to cause a relative movement of the piston 5 with respect to the lock 2 in order to disengage the latter;

E2: rotation of the lock 2 so as to allow the lock to come out of the latch fitting and unlock it.

The first step E1 may simply consist in pushing the piston 5 in order to move it translationally against the force of the elastic means 6. The second step E2 may consist in turning the lock through one quarter of a turn, or in turning it through half a turn or less.

The method may comprise a prior step E0 of attaching the tool 11 to corresponding elements 7 at the vehicle bodyshell or the battery, in order to ensure that it is correctly positioned with respect to the battery 1 and notably its locking system before the removal method described above is implemented reliably and well.

The element 7 for attaching the tool 11 may be in the form of mushroom heads, which will preferably be arranged in such a way as to be accessible, of a shape that is easy to clean, resistant to the high stresses applied to them and which are not excessively bulky. Advantageously, two mushroom heads are distributed symmetrically about the lock, in order to hold the tool stable. As an alternative, any other number of mushroom heads and any shape of attachment elements 7 are acceptable without departing from the concept of the invention.

The tool can be attached to the mushroom heads by two types of movement: either through a translational movement or through a rotation in the plane of the mushroom heads.

Finally, the removal method comprises one last step E4 of withdrawing the unlocked battery. To do that, the tool 11 may simply be returned in a translational movement in order to withdraw it and, at the same time, the battery.

These steps of the method for removing the battery are therefore performed via movements of a tool 11 which can be carried out in various ways, using independent actuators of the electric or hydraulic type, using cam-operated dynamics, etc.

FIG. 2 illustrates one first embodiment of a tool 11 capable of automatically carrying out the method of removing a battery according to the invention.

The tool 11 comprises an upper end 14 mounted on a cylindrical vertical rod 12 intended to collaborate with the connecting part of the lock 2. This collaboration is illustrated more specifically in FIG. 3, in a phase during which the tool 11 is nearing the lock 2, of which only the lower connecting part 4 and the two mushroom-shaped lateral connecting elements 7 are depicted. The end 14 of the tool 11 comprises two slots 17 positioned symmetrically about a connecting element 18 which is in the form of a mortice capable of accepting a corresponding rod to form a collaboration of flat/flatted type, not depicted, positioned under the surface of the connecting element 4 of the lock 2. Each slot 17 has a substantially circular part 19 of substantial size, corresponding to a mushroom head 7, so that such a mushroom head can be inserted via this circular part 19. Following on from that, each slot 17 comprises a narrower part 20 forming a portion of a circular arc, within which the narrower part 8 of a mushroom head can move after it has been inserted through the opening 19. Thus, during the step E0 of attaching the tool 11, the openings 19 are brought closer to the mushroom heads until the latter become inserted in these openings, before the spindle 12 that locks the tool 11 in position via the mushroom heads 7 is rotated. As an alternative, this attachment could be obtained using a different geometry and/or different movements, such as a translational movement. Thereafter, the central part of the spindle 12 moves in a vertical translational movement to come to rest against the piston 5 and disengage the lock, according to step E1. Finally, rotation of the connecting element 18 turns the lock to unlock it, according to step E2.

In order to obtain these various movements, the tool 11 has three independent motors, for example electric or pneumatic or hydraulic motors, an upper link rod 21 for attaching the tool to the mushroom heads, a lower link rod 22 for turning the central part of the spindle 12 to unlock the lock, and a device 23 for causing the translational movement of the spindle 12. Note that these two movements may be coupled.

Figure 3:
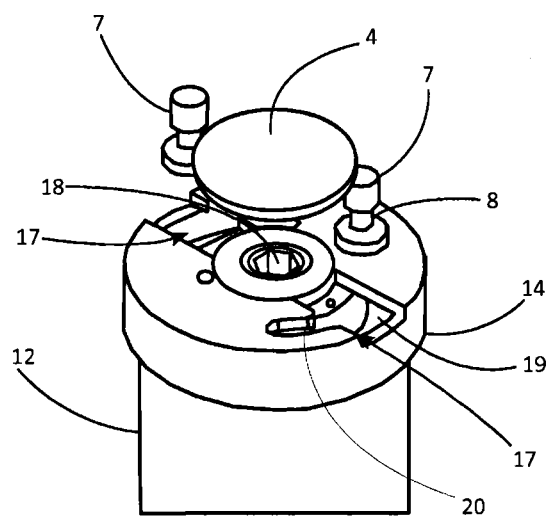
FIG. 3 is a perspective view from above of a detail of how the battery and the tool collaborate with one another to implement the method for mounting or removing a battery according to the first embodiment of the invention.
Figure 4:
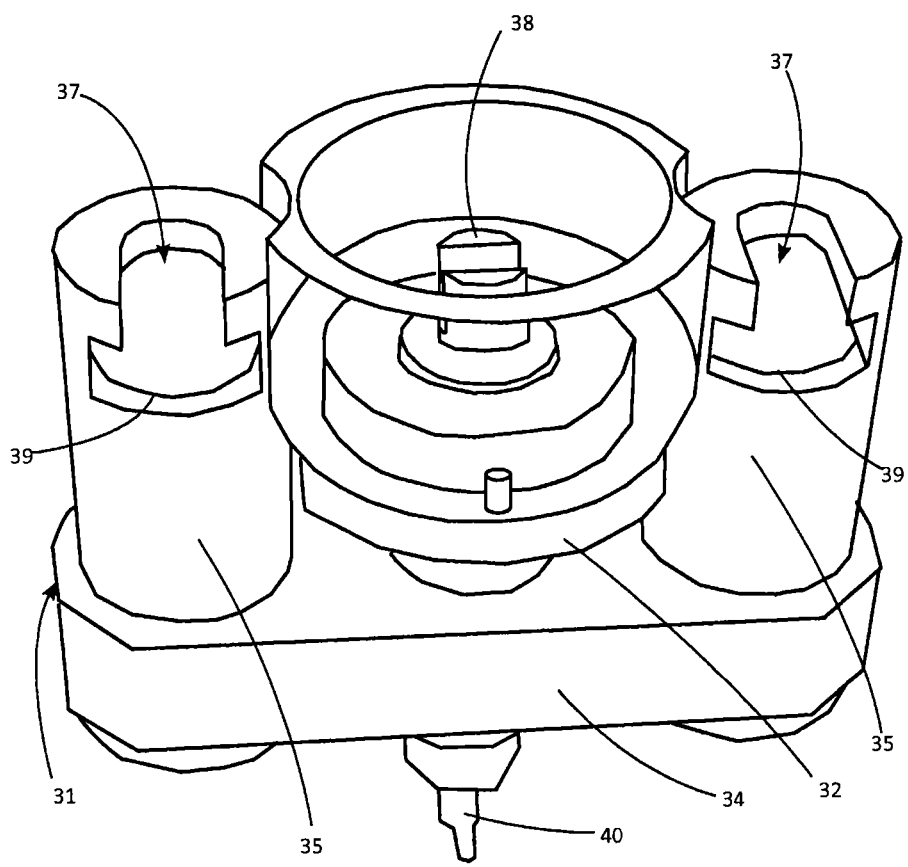
FIG. 4 is a perspective view from above of a manual tool that can be used to implement the method for mounting or removing a battery according to a second embodiment of the invention.
Figure 5:
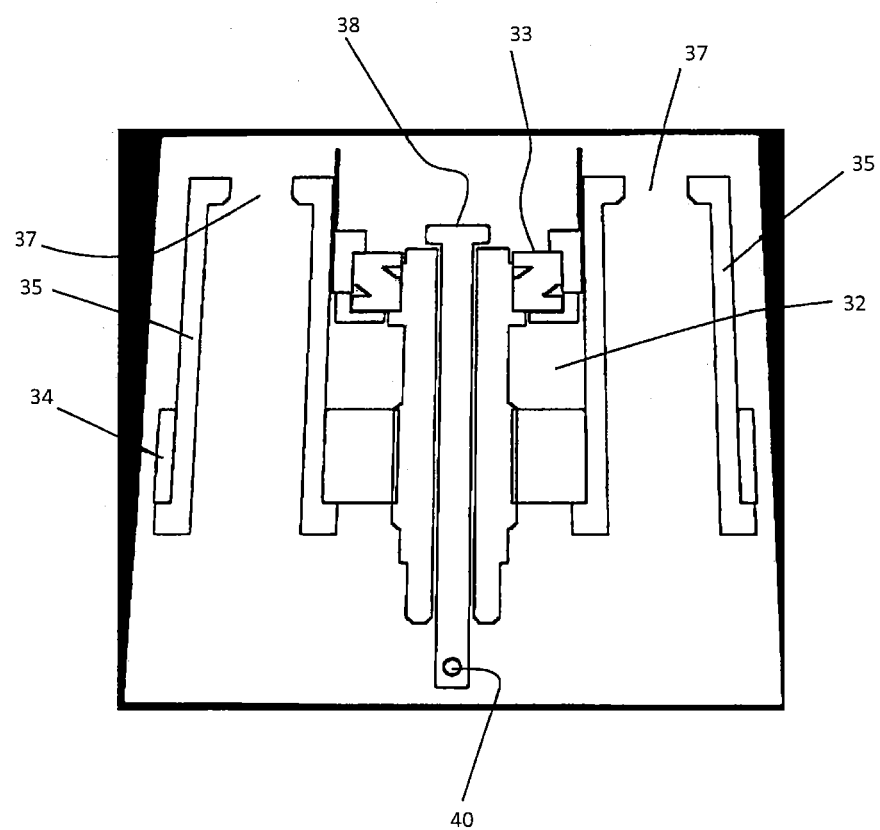
FIG. 5 is a front view in cross section of the manual tool that can be used to implement the method for mounting or removing a battery according to the second embodiment of the invention.

FIGS. 4 and 5 illustrate a tool 31 for mounting and/or removing a battery manually according to a second embodiment of the invention. This tool comprises a base 34 above which there extends a central cylindrical body 32, comprising a first central rod the upper end of which forms a connecting element 38 intended to collaborate with the corresponding connecting element of the lock. In this embodiment, this connection is of the flat/flatted type. This central rod comprises an actuating element 40 in its lower part, under the base 34, designed for turning it manually. Around this central rod there is a complementary element, capable of a translational movement through a screw—jack principle, the upper end 33 of which is intended to come to rest against the piston so as to relieve the lock of its applied load. As an alternative, this mobility could be obtained by any other solution, a hydraulic actuator, a system based on cams, a pneumatic system, or a lever, etc. Finally, the tool 31 comprises two cylindrical lateral parts 35 comprising attachment elements 37 in their upper part to collaborate with the attachment elements 7 provided on the battery. In this embodiment, these attachment elements 37 comprise an opening 39 in the peripheral part allowing integration of a wide lower part of a connecting element of the mushroom head type as depicted in FIG. 3, followed by an upward opening to allow the narrower part 8 of such a mushroom head to pass. This geometry keeps the tool on the battery in the direction parallel to the axis of the cylinders 35, which is intended to be substantially vertical.

The tool according to the second embodiment is thus suitable for rapid handling and purely manual use. This tool, which allows ergonomic manual use, is a portable tool. It is more particularly intended for repairing motor vehicles at dealerships, in after sales operations, or can even be used at the assembly plant.

Finally, two types of tool have been described by way of example. Other geometries could be conceived of. It is clear from the foregoing description that the invention ultimately relates to a tool for mounting or removing a battery which comprises the following three essential means:

at least one means for attaching the tool to the battery, or to the bodyshell. Attachment to the battery makes it possible to avoid transferring significant load to the bodyshell. This attachment means has the purpose of acting as a support for transferring load from the tool to the battery in order to release it;

a means of releasing the load on the lock, which means may consist of an element capable of a vertical translational movement;

a means of locking and/or unlocking the battery, which may consist in a turning of a lock.

The invention claimed is:

1. A tool for mounting or removing a container of energy that powers an engine or motor that propels a motor vehicle, fixed to the motor vehicle using a lock on which there acts a piston that loads the lock, comprising:
    at least one means for attachment of the tool to the container of energy;
    means for releasing the load on the lock by acting on the piston; and
    means for locking and/or unlocking the container of energy,
    wherein the at least one means for attachment includes two slots positioned symmetrically about the means for locking and/or unlocking the container of energy, each of the slots including a circular part to receive a mushroom head extending from the container of energy, and each of the slots including a narrow part to receive a narrow part of the mushroom head after the mushroom head is inserted into the slot.

2. The tool for mounting or removing the container of energy as claimed in claim 1, wherein the means for locking and/or unlocking the container of energy is arranged in the upper part of a rod capable of turning.

3. The tool for mounting or removing the container of energy as claimed in claim 2, wherein the locking and/or unlocking means has a male or female connection, of the hexagonal or rectangular or square or flat or flatted type.

4. The tool for mounting or removing the container of energy as claimed in claim 2, wherein the means for releasing the load on the lock has translational mobility about the rod of the means for locking and/or unlocking the container of energy.

5. The tool for mounting or removing the container of energy as claimed in claim 4, wherein the means for releasing the load on the lock has mobility via a screw/jack principle, a hydraulic actuator, a cam system, a pneumatic system or a lever.

6. The tool for mounting or removing the container of energy as claimed in claim 1, wherein the means for releasing the load on the lock and the means for locking and/or unlocking the container of energy are formed in the upper part of a central cylindrical body of the tool.

7. The tool for mounting or removing the container of energy as claimed in claim 1, wherein the tool is portable and suited to manual use.

8. The tool for mounting or removing the container of energy as claimed in claim 1, wherein the tool is motorized.

9. A tool for mounting or removing a container of energy that powers an engine or motor that propels a motor vehicle, fixed to the motor vehicle using a lock on which there acts a piston that loads the lock, comprising:
    at least one means for attachment of the tool to the container of energy;
    means for releasing the load on the lock by acting on the piston; and
    means for locking and/or unlocking the container of energy,
    wherein the at least one means for attachment includes two attachment elements positioned in two cylindrical lateral parts, each of the attachment elements including an opening in a peripheral part of the cylindrical lateral part to receive a wide lower part of a mushroom head extending from the container of energy, and each of the attachment elements including an upward opening to receive a narrow part of the mushroom head.

10. A tool for mounting or removing a container of energy that powers an engine or motor that propels a motor vehicle, fixed to the motor vehicle using a lock on which a piston acts to load the lock, the container of energy including lateral connecting elements extending therefrom, the tool comprising:
    attachment elements that include openings to receive the lateral connecting elements therein to attach the tool to the container of energy;
    a central element that is translated to contact the piston and disengage the lock; and
    a connecting element that contacts the lock after the lock is disengaged by the central element, and is then rotated to unlock the lock,
    wherein the openings in the attachment elements include two slots positioned symmetrically about the central element, each of the slots including a circular part to receive a mushroom head of the lateral connecting elements extending from the container of energy, and each of the slots including a narrow part to receive a narrow part of the mushroom head after the mushroom head is inserted into the slot.

11. A system for a motor vehicle, comprising:
    a container of energy that powers an engine or motor to propel the motor vehicle, the container comprising:
        a lock that attaches the container of energy to the motor vehicle,
        a piston that acts on the lock to load the lock, and
        lateral connecting elements extending from the container of energy, the lateral connecting elements each including a mushroom head; and
    a tool to mount or remove the container of energy from the motor vehicle, the tool comprising:
        attachment elements that include openings to receive the lateral connecting elements therein to attach the tool to the container of energy,
        a central element that is translated to contact the piston and disengage the lock, and
        a connecting element that contacts the lock after the lock is disengaged by the central element, and is then rotated to unlock the lock,
    wherein the openings in the attachment elements include two slots positioned symmetrically about the central element, each of the slots including a circular part to receive the mushroom head extending from the container of energy, and each of the slots including a narrow part to receive a narrow part of the mushroom head after the mushroom head is inserted into the slot.

* * * * *